Patented June 19, 1951

2,557,814

UNITED STATES PATENT OFFICE 2,557,814

DISPERSING INSECTICIDES AS VAPORS

John Merritt Dinsdale, Phyllis May Holmes, and Pamela Ruth Martin, High Post, Salisbury, England, assignors to Waeco Limited, a British company No Drawing. Application November 14, 1949, Serial No. 127,264. In Great Britain November 23, 1948

2 Claims. (Cl. 167—40)

This invention relates to dispersing insecticides or other pesticidal compounds and is more particularly concerned with the method of dispersing insecticidal compounds by "smoke" generation, in which the pesticidal compound is admixed with a self-combustible composition which on burning vaporises the pesticidal compound.

It is the usual practice to enclose a charge of the self-combustible composition with the pesticidal compound admixed in it in a container, such as an aluminum or cardboard tube, which is open at one end and so that when the composition is ignited it burns slowly vaporising the pesticidal compound which issues from the open end of the container as a "smoke" comprising the vaporised pesticidal compound in admixture with combustion gases produced by burning of the self-combustible composition.

It is well-known that the "smoke" generated by some compositions will inflame unless special precautions are taken, that is the vapours will catch fire immediately on issuing from the container. This is disadvantageous in that a large proportion of the pesticidal compound will be destroyed by being burnt.

It has therefore been proposed to provide a container in which the charge of the self-burning composition and pesticidal compound is separated from the ultimate outlet from the container by one or more mechanical baffles, formed for example for perforated metal sheet, so that the vapours and combustion gases cannot flow directly from the composition to atmosphere. Such an arrangement is disadvantageous in that with small containers the provision of mechanical baffling means reduces to a substantial extent the space available for the charge, so that for a given size of container a relatively smaller space can be treated with the "smoke" of the pesticidal compound as compared with a container completely filled by the charge.

This invention has for an object to provide an improved self-combustible composition which, when used for generation of the pesticidal "smoke," does not give rise to vapours which will inflame.

It has now been found that a self-combustible composition comprising hexamine together with a highly oxygenated inorganic compound such as potassium chlorate admixed in suitable proportions can be employed with certain pesticidal compounds to produce a non-inflaming pesticidal "smoke."

According to this invention therefore a charge for producing a non-inflaming pesticidal "smoke" comprises in admixture suitable proportions of a vaporisable pesticidal compound, a highly oxygenated inorganic compound, and hexamine.

All pesticidal compounds of vaporisable type are not suitable for use in the charge, for instance although the insecticides known as D. D. T. and benzene hexachloride may be used in the charge, the insecticide known as azobenzene (benzene-azo-benzene) cannot be so used.

Not only does the charge burn without the "smoke" inflaming but the efficiency of the self-combustible composition comprising a hexamine and highly oxygenated inorganic compound as a vaporiser for the pesticidal substance is such that a large proportion of the charge can be formed by the pesticidal compound and a large proportion of the pesticidal compound can be vaporised without decomposition so that the overall efficiency of a generator containing the charge is high, that is for a given size of container a relatively large space can be treated with the "smoke."

The proportion of the insecticide in the charge is normally determined in accordance with its latent heat of vaporization; for example, the proportion of D. D. T. by weight to the weight of the hexamine combined with the highly oxygenated inorganic compound should preferably lie within the limits of 1:1 and 3.5:1.

The quantity of highly oxygenated inorganic compound employed may vary within certain limits, for instance, the proportion of potassium chlorate to hexamine may lie within the limits 0.75:1 and 5.0:1, the best ratio being 2.4:1.

According to a feature of this invention, the charge may also comprise a small proportion of kaolin, preferably in finely divided state, such as colloidal kaolin, or diatomaceous silica, or finely-divided native magnesium silicate, such as talc, or another chemically inert substance of like physical properties.

Many "smoke" generating compositions are of an explosive nature, that is they may when subject to certain tests, explode, and it has been found that the addition of a small proportion of kaolin, such as colloidal kaolin, or diatomaceous silica or other chemically-inert finely-divided substance has the effect of rendering the composition non-explosive when subjected to the tests referred to.

The quantity of kaolin, diatomaceous silica or similar substance necessary to render the charge non-explosive varies with the chlorate content. In general it has been found that at least 5% by weight of the charge should be the chemically inert substance and the proportion may be varied from between about 5% by weight and 30% by weight of the charge.

It has also been found that the "smoke" generating composition can be employed without an enclosing container by forming it into a pellet.

Accordingly this invention comprises as an important feature forming improved "smoke" generating composition into a pellet which can be burnt without an enclosing container. This may be achieved by slightly moistening the dry composition with an aqueous solution of gum arabic or alcohol or another suitable organic solvent to form a crumbly mass of dry appearance and then moulding the mass. For example, the composition may be moistened with 10 cc. of a 1% aqueous solution of gum arabic for each 100 grams of the composition to produce the crumbly mass which can then be moulded into pellets and the pellets then dried for 2 to 3 days at a temperature of between 30–40° C.

Alternatively the composition may be moistened with alcohol the quantity employed being insufficient to produce a paste, and the crumbly mass thus produced moulded into pellets which can be dried in an oven for a few hours at 50–60° C.

In a test, an aluminium tube 88 mm. long and 36 mm. in diameter which was closed at one end and had an aperture at the other was filled with a charge of 85 grams of a mixture comprising:

| | Per cent |
|---|---|
| D. D. T. | 64 |
| Potassium chlorate | 19 |
| Hexamine | 8 |
| and Colloidal Kaolin | 9 | and the surface of the charge was dusted with a composition comprising:

61% D. D. T.
23% potassium chlorate
11% thiourea
and
5% urea the dusting acting as an igniter for the main charge.

The weight of the charge is substantially higher than that which can be employed when mechanical anti-flaming baffling is required. For instance, the weight of the charge of a known composition comprising:

| | Per cent by weight |
|---|---|
| D. D. T. | 64 |
| Potassium chlorate | 17 |
| Sucrose | 17 |
| Magnesium oxide | 2 | which can be employed in a similar aluminium tube provided with anti-flaming baffling, was 60 grams.

The charge was ignited and although the surface of the charge was open to atmosphere no inflaming of the "smoke" generated occurred.

Even when a match was applied to the "smoke" as it left the container general inflaming of the "smoke" did not occur. For a short period after the charge had been ignited local burning of the vapours or "smoke" occurred when a match was applied to the "smoke" but after the charge had been burning a short time no such local inflaming occurred and the match flame was extinguished by the "smoke."

About 53 parts of the 64 parts of insecticide were found to have been vaporised without decomposition, that is about 83% of the insecticide was vaporised without decomposition. That is 45 grams of D. D. T. were vaporised without decomposition. With the known composition, 45 parts of the 64 parts of the D. D. T. that is 27 parts were vaporised without decomposition.

In another test, the "smoke" generating composition according to this invention as employed in the first example was moistened with 10 ccs. of a 1% aqueous solution of gum arabic for each 100 grams of the composition to form a crumbly mass of dry appearance. The quantity of gum arabic solution was insufficient to form a paste. The crumbly mass was formed into cylindrical pellets which weighed about 4 grams each and were 11 mm. in diameter and 12 mm. long. The pellets were dried for 2–3 days at a temperature of about 30–40° C.

The pellets could be ignited easily by applying a burning match to them. Inflaming of the smoke occurred initially but ceased as soon as the burning match was withdrawn from the pellet.

Similar results were obtained by compositions in which benzene hexachloride was substituted for the D. D. T. and in which diatomaceous silica or finely divided talc was substituted for the kaolin.

We claim:

1. A composition for use in the generation of insecticidal smokes, comprising, in admixture hexamine, a highly-oxygenated inorganic compound for providing oxygen for the combustion of the hexamine, the ratio of the weight of the inorganic compound to the weight of hexamine being within the limits 0.75:1 and 5.0:1, and a thermally vaporisable halogenated organic insecticidal compound whose vapours are heat-decomposable, the ratio of the weight of the insecticidal compound to the combined weight of hexamine and inorganic compound being within the limits about 2.3:1 to 3.5:1, whereby, on combustion of the composition, flaming and thus heat-decomposition of the heat-decomposable vapours is avoided.

2. A composition for use in the generation of insecticidal smokes, comprising in admixture hexamine, potassium chlorate for providing oxygen for the combustion of the hexamine, the ratio of the weight of the potassium chlorate to the weight of hexamine being within the limits 0.75:1 and 5.0:1, and a thermally vaporisable halogenated organic insecticidal compound whose vapours are heat-decomposable, the ratio of the weight of the insecticidal compound to the combined weight of hexamine and potassium chlorate being within the limits about 2.3:1 to 3.5:1, whereby, on combustion of the composition, flaming and thus heat-decomposition of the heat-decomposable vapors is avoided.

JOHN MERRITT DINSDALE.
PHYLLIS MAY HOLMES.
PAMELA RUTH MARTIN.

REFERENCES CITED

The following references are of record in the file of this patent:

UNITED STATES PATENTS

| Number | Name | Date |
|---|---|---|
| 15,243 | Lanergan | July 1, 1856 |
| 232,695 | Detwiller | Sept. 28, 1880 |
| 1,207,766 | Katzenberger | Dec. 12, 1916 |
| 2,154,221 | Taylor | Apr. 11, 1939 |
| 2,165,263 | Holm | July 11, 1939 |
| 2,385,636 | McLain | Sept. 25, 1945 |
| 2,440,082 | Flanders | Apr. 20, 1948 |
| 2,532,349 | Taylor | Dec. 5, 1950 |

FOREIGN PATENTS

| Number | Country | Date |
|---|---|---|
| 155,468 | Switzerland | June 30, 1932 |
| 397,238 | Great Britain | Aug. 24, 1933 |